United States Patent Office 2,955,093
Patented Oct. 4, 1960

2,955,093

INHIBITION OF MOLD CORROSION FOR QUATERNIZED POLYMERS

Paul W. Solomon, Phillips, Tex., assignor to Phillips Petroleum Company, a corporation of Delaware No Drawing. Filed June 28, 1957, Ser. No. 668,613

9 Claims. (Cl. 260—23.7)

This invention relates to a method of preventing corrosion of molds when curing a composition comprising quaternizable heterocyclic nitrogen-base polymer and quaternizing agent. In another aspect this invention relates to a compounded stock comprising quaternizable heterocyclic nitrogen-base polymer and quaternizing agent which can be cured with substantially no resulting corrosion of the curing molds. In still other aspects this invention relates to a product comprising a quaternized heterocyclic nitrogen-base polymer which can be made by molding and curing without corroding the curing molds, and to a method of making such a product.

Quaternized polymers of heterocyclic nitrogen bases of the pyridine and quinoline series which have been cured are valuable materials for many applications. These compounds are quite resistant to the action of oils and various types of solvents. Good oil resistance enables these materials to be especially useful as gasket stock. Serious corrision of the curing molds has been observed, however, when these quaternized stocks are molded and cured. While the exact cause of this corrosion has not been determined, it has been observed that the corrosion problem is particularly serious when the quaternizing agent is an organic halide. This problem has existed for several years and its magnitude is such that commercial use of these valuable quaternized polymers is at stake. Corrosion or mold pitting of any degree cannot be tolerated by fabricators of finished rubber articles. Serious consideration has been given to such costly solutions as gold or silver plating the molds or constructing them of titanium metal. Such solutions have obvious drawbacks since the industry would be extremely reluctant to abandon its chromium plated and steel molds currently in use.

I have discovered that the above described corrsion problem can be successfully solved by incorporating into the polymer stock prior to curing a corrision inhibiting amount of a material selected from citrates and stearates of metals selected from nickel, copper, iron and lead. By balancing the amounts of quaternizing agent and a corrosion inhibitor as above defined, the problem of mold corrosion can be solved without deleterious effects upon the quaternized product.

It is an object of this invention to provide a method of curing compositions comprising quaternizable heterocyclic nitrogen-base polymers and quaternizing agents with substantially no mold corrosion. It is another object of this invention to provide a method of making such a quaternized product without costly damage from corrosion to the curing molds. Still another object is to provide a compounded stock containing (1) a polymer prepared from a monomer system comprising a polymerizable heterocyclic nitrogen-base monomer and (2) a quaternizing agent, which can be molded and cured without damaging the molds. Another object is to provide a product from materials comprising a heterocyclic nitrogen-base monomer which product can be formed by quaternizing and curing in steel molds without corrosion thereof. Other objects, advantages and features will be apparent to those skilled in the art from the following description, examples and appendant claims.

Quaternized heterocyclic nitrogen-base polymers are known in the art and their formation per se is not a part of this invention. These polymers which have proved especially valuable are those prepared from polymerizable heterocyclic nitrogen-base compounds of the pyridine and quinoline series either as homopolymers or with other materials copolymerizable therewith such as conjugated dienes and monomers having an active vinylidene group. These polymers and their quaternization are fully described in the copending application of Pritchard, filed June 4, 1956, Serial No. 588,957.

The polymers to which this invention applies can be prepared by any suitable method, such as by emulsion polymerization. For example, copolymers of heterocyclic nitrogen-base monomers and conjugated dienes can be formed over a wide range of molecular weights ranging from fluid and very viscous liquids to hard solid rubbery materials.

One convenient method of preparing these polymers is by polymerization of the monomers in an aqueous emulsion in the presence of soap, potassium persulfate and an aliphatic mercaptan. At the conclusion of the reaction a short-stopping agent and an anti-oxidant are added. Coagulation can be effected by various well-known techniques and the polymer dried. Heating in vacuum at a temperature of about 60° C. for about 48 hours is generally sufficient to dry the polymer. Other well-known polymerization recipes can also be used for preparing the polymers employed in the practice of this invention. The heterocyclic nitrogen-base monomers which are used to prepare the polymers for my invention have the formula

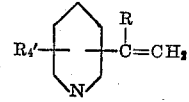

or

or

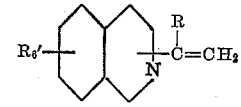

where R is a hydrogen or a methyl radical and each R' is an alkyl radical or a hydrogen, the combined R' groups having not over 12 carbon atoms. In the above formulas the groups —R' and

can be on any substitutable carbon in either the heterocyclic or carbocyclic ring. It is to be understood that mixtures of various copolymerizable heterocyclic nitrogen bases and materials copolymerizable therewith, preferably conjugated dienes, can be employed in the formation of these polymers together with, if desired, up to about 50 percent by weight, preferably between 5 and 30 percent by weight of the total monomeric material, of other copolymerizable materials, such as acrylonitrile styrene, and the like.

Representative heterocyclic nitrogen base compounds useful in the practice of this invention include: 2-vinylpyridine; 2 - methyl - 5-vinylpyridine; 5-methyl-2-vinylpyridine; 3-ethyl-5-vinylpyridine; 5-ethyl-2-vinylpyridine; 4-methyl - 3 - vinylpyridine; 2,3,4-trimethyl-5-vinylpyridine; 2 - isopropenylpyridine; 5-propyl-2-isopropenylpyridine; 2-octyl-5-vinylpyridine; 5 - dodecyl-2-vinylpyridine; 2-vinylquinoline; 8 - ethyl-2-vinylquinoline; 4-hexyl-5-vinylquinoline; 1-vinyl-isoquinoline; 5-methyl-1-isopropenyl-isoquinoline; and the like.

Materials copolymerizable with the above-mentioned heterocyclic nitrogen-base compounds include conjugated dienes and other copolymerizable materials such as styrene; alpha-methyl-styrene; halogen-, alkyl-, and alkoxy-substituted styrenes; acrylonitrile; methacrylonitrile; methyl acrylate; methyl methacrylate; ethyl acrylate; ethyl methacrylate; methyl vinyl ketone; methyl isopropyl ketone; methyl vinyl ether; and the like.

The conjugated dienes employed in the production of the copolymers employed in the practice of this invention are preferably those conjugated dienes which contain four to six, inclusive, carbon atoms per molecule and include 1,3-butadiene, isoprene, piperylene, methylpentadiene, 2,3-dimethyl-1,3-butadiene, chloroprene and others. However, conjugated dienes having more than 6, such as 8, carbon atoms per molecule can also be used. Furthermore various alkyoxy, such as methoxy and ethoxy, and cyano derivatives of these conjugated dienes can also be used in preparing the polymers for my invention.

For the production of the copolymers employed in the practice of my invention the amount of copolymerizable material employed, such as a conjugated diene, is generally in the range of from 25 to 98 parts per 100 parts by weight of the total monomeric material, preferably 50 to 98 parts per 100 parts by weight, and the amount of copolymerizable heterocyclic nitrogen base employed is in the range from 75 to 2 parts per 100 parts by weight of the total monomeric material, preferably 50 to 2 parts per 100 parts by weight, the proportions of the monomeric material employed depending upon the type of copolymer desired.

Quaternizing agents or mixtures thereof which yield solid polymers in accordance with this invention are numerous and include various halogen substituted hydrocarbons such as substituted cycloalkanes and substituted alkanes. These componds contain at least one hydrogen atom attached to a carbon atom. The substituted alkanes in turn include alkyl halides, alkylene halides, and aromatic substituted halogenated alkanes. Representative cycloalkanes include 1,2-dibromocyclohexane, 1-methyl-2,3-dichlorocyclopentane, and the like. Representative alkyl halides include methyl iodide, methyl bromide, ethyl iodide, propyl iodide, hexyl iodide, nonyl iodide, cetyl bromide, and the like. Representative alkylene halides include 1,2-dichloroethane, 1,2-dibromoethane, 1,2-dichloropropane, 1,2-dibromooctane and the like. Representative aromatic substituted halogenated alkanes include benzyl chloride, benzal chloride, benzotrichloride, and halogenated xylenes, particularly the chlorinated xylenes such as 1,3-, and 1,4-bis(trichloromethyl) benzene; 1,2-, 1,3- and 1,4-bis(dichloromethyl)benzene; 1,2-, 1,3-, and 1,4-bis(monochloromethyl)benzene; 1-trichloromethyl - 2 - dichloromethylbenzene; 1 - trichloromethyl - 4 - monochloromethylbenzene; 1 - dichloromethyl-3-monochloromethylbenzene; and the like.

Other halogen substituted alkanes include bromoform, chloroform, iodoform and the like which contain at least one hydrogen atom attached to a carbon atom. The substituted halogenated hydrocarbons also include 2,3-dibromopropene-1 and various polyhalogenated alkanes such as 1,2,3,4-tetrabromobutane and polyhalogenated cycloalkanes such as hexachlorocyclopentadiene. Other halogenated organic compounds useful as quaternizing agents include acetyl chloride, chloroacetyl chloride, ethylene chlorohydrin, picryl chloride, benzoyl chloride, benzene sulfonyl chloride, and the like. Another useful group of quaternizing agents includes methyl sulfate, ethyl sulfate, methylbenzene sulfate, and the like. The foregoing enumeration is not intended to include all the possible suitable quaternizing agents, but is only representative since many others can be used.

The quaternizing agents for which I have found my invention especially valuable in the inhibition of serious mold corrosion are those agents having a multiplicity of functional groups on the same carbon atom, particularly organic halides, such as benzotrichloride, benzal chloride and hexachloro-p-xylene. Specific polymers for which I have found my invention particularly useful are polymers which are prepared by polymerizing a monomer system comprising, as the heterocyclic nitrogen-base monomer, 2-vinylpyridine or 2-methyl-5-vinylpyridine. The homopolymer can be used but generally the heterocyclic nitrogen-base monomers are copolymerized with a conjugated diene such as butadiene or formed as the terpolymer with acrylonitrile.

When quaternizing the above-described heterocyclic nitrogen-base polymers, an amount of quaternizing agent is generally employed which is sufficient to convert a portion of the pyridine or quinoline units of the polymer to the corresponding pyridinium or quinolinium units. If desired, more or less than a stoichiometric amount of quaternizing agent can be employed depending upon the desired physical properties of the product. Generally, the amount of quaternizing agent is about 0.2 to 1.1 mols per mol of reactive nitrogen in the polymer. Cellular products can be produced by employing an excess of quaternizing agent which decomposes at curing temperatures; for example, up to 5 mols of quaternizing agent per mol of reactive nitrogen can be used. The curing temperature at which the quaternizing agent is reacted in the mold is usually in the range between 0 to 250° C. although higher or lower temperatures can be used. The time required to substantially completely effect a reaction is dependent upon the temperature employed and usually varies from a few minutes, about 5 to 10 minutes to about 10 hours or more.

The organic acid salts which are used as corrosion inhibitors when quaternizing heterocyclic nitrogen-base polymers according to my invention are the nickel, copper, iron or lead salts of citric or stearic acid. These compounds are commercially available or can be readily prepared from available compounds by methods well known to those skilled in the art. To obtain a maximum of corrosion inhibition with a minimum effect upon the physical properties of the final product I prefer to employ the citrate or stearate of nickel. Other salts of the above defined class which are applicable are copper stearate, copper citrate, iron stearate, iron citrate, lead stearate and lead citrate.

The quantity of corrosion inhibitor required to prevent mold corrosion when quaternized polymers of the type hereinbefore described are cured depends upon both the quaternizing agent and the particular corrosion inhibitor employed. Generally, however, the amount of corrosion inhibitor used is in the range of 0.05 to 3 mols of inhibitor per mol of quaternizing agent. It is ordinarily desirable to use the minimum amount of inhibitor necessary so that physical properties of the quaternized stock are not adversely affected. Greater amounts of inhibitor can be employed if desired when the application of the elastomer does not require high tensile strength and elongation. Optimum amounts of inhibitor can readily be determined for any given quaternizing agent.

Any of several suitable methods can be employed to incorporate the corrosion inhibitor into the polymeric material such as by mill mixing or masticating or by mixing in an internal mixer such as a Banbury mixer. These mixing methods are those generally employed in the art for compounding stocks of this nature prior to curing. Addition of the inhibitor to the latex prior to coagulation is an alternative method for inhibitors which will not be dissolved and washed from the coagulant into the serum.

To further describe my invention specific embodiments are set forth in the following examples which are meant to be exemplary only and should not be interpreted as limiting my invention unduly.

Examples

An 85/15 butadiene/2-methyl-5-vinylpyridine rubber, prepared by emulsion polymerization at 41° F., was compounded in a gasket stock recipe in which the rubber was quaternized with hexachloro-p-xylene. A rubber of this type can be obtained by copolymerizing butadiene with 2-methyl-5-vinylpyridine in accordance with the following recipe:

| | Parts by weight |
|---|---|
| Water | 200 |
| Butadiene | 85 |
| 2-methyl-5-vinylpyridine | 15 |
| Potassium fatty acid soap | 6 |
| KOH | 0.1 |
| KCl | 0.3 |
| Tamol N [1] | 0.3 |
| $FeSO_4 \cdot 7H_2O$ | 0.02 |
| Sequestrene AA [2] | 0.04 |
| Sodium formaldehyde sulfoxylate | 0.1 |
| p-Menthane hydroperoxide | 0.1 |
| Tert-dodecyl mercaptan, original charge | 0.24 |
| Tert-dodecyl mercaptan, increment at 60% conversion | 0.24 |

[1] Sodium salt of a naphthalene sulfonic acid condensed with formaldehyde.
[2] Ethylenediamine tetraacetic acid.

A conversion of 90–95 percent is reached in 20 hours when polymerization is effected in accordance with this recipe.

Nickel citrate and nickel stearate were employed as mold corrosion inhibitors in the gasket stock recipe. One run was made in which no corrosion inhibitor was present. The recipe was as follows:

| | Parts by weight |
|---|---|
| Butadiene/2-methyl-5-vinylpyridine rubber | 100 |
| Carbon black [1] | 150 |
| Zinc oxide | 5 |
| Stearic acid | 1 |
| BLE [2] | 3 |
| Plasticizer SC [3] | 20 |
| Altax [4] | 3 |
| Sulfur | 0.25 |
| Hexachloro-p-xylene | 10 (0.032 mol) |
| Mold corrosion inhibitor [5] | 0 |
| Nickel citrate | 5 (0.009 mol) |
| Nickel stearate | 5 (0.008 mol) |

[1] Thermax.—A soft, semi-reinforcing carbon black.
[2] High temperature reaction product of diphenylamine and acetone.
[3] Glycol ester of vegetable oil fatty acid.
[4] Benzothiazyl disulfide.
[5] Mols corrosion inhibitor per mol hexachloro-p-xylene:
  Nickel citrate [a] _____ 0.28
  Nickel stearate [b] _____ 0.25

[a] Calculation of mol quantity based on

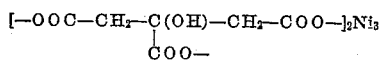

as formula for nickel citrate.
[b] Calculation of mol quantity based on $(C_{17}H_{35}COO)_2Ni$ as formula for nickel stearate.

The stocks were milled and cured 45 minutes at 307° F. against stainless steel shim stock. The shims were examined for pitting and tensile strength and elongation of the test specimens were determined. Results were as follows:

| Corrosion Inhibitor | 80° F. | | Pitting Rating [1] |
|---|---|---|---|
| | Tensile, p.s.i. | Elongation, Percent | |
| Nickel citrate | 2,500 | 120 | 0–1 |
| Nickel stearate | 2,500 | 180 | 1 |
| None | 2,510 | 150 | 10 |

[1] 0=no pits; 10=many pits.

As shown by the above data, nickel citrate and nickel stearate act to prevent corrosion during curing and quaternization of butadiene/2-methyl-5-vinylpyridine rubber without appreciably effecting the physical properties of the final product. Formation of the pyridinium derivative by quaternization yields a corroding reaction mixture, the effect of which can be satisfactorily counteracted by the use of the corrosion inhibitors according to my invention. In the use of metal salts for inhibiting corrosion of this type, nickel, copper, iron and lead salts have been found particularly valuable. It is quite significant that the inhibitors of my invention provide complete or substantially complete protection against corrosion which would otherwise destroy stainless steel of the type used in curing molds.

I claim:

1. A compounded stock of quaternizable heterocyclic nitrogen-base polymer which can be cured with substantially no mold corroding effect comprising a polymer of a monomer system which comprises in 100 parts of polymerizable material from 75 to 2 parts by weight of a vinyl-substituted pyridine and from 25 to 98 parts by weight of a copolymerizable conjugated diene having from 4 to 8 carbon atoms per molecule; from about 0.2 to 1.1 mols of an organic halide quaternizing agent which quaternizes with a mold corroding effect selected from the group consisting of hexachloro-p-xylene, benzotrichloride, and benzal chloride per mol of reactive nitrogen in said polymer; and from 0.05 to 3 mols of a compound selected from the group consisting of citrates and stearates of metals selected from the group consisting of nickel, copper, iron and lead per mol of said quaternizing agent.

2. A compounded stock according to claim 1 wherein said pyridine is 2-methyl-5-vinylpyridine and said conjugated diene is 1,3-butadiene.

3. A method of forming a quaternized heterocyclic nitrogen-base polymeric product so that while curing said product corrosion of the curing molds is substantially eliminated which comprises blending with a polymer of a monomer system comprising a substituted heterocyclic nitrogen-base monomer selected from the group consisting of (a)

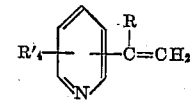

(b)

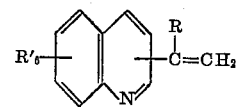

and (c)

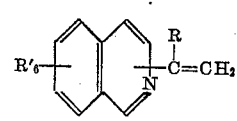

where R is selected from the group consisting of hydrogen and methyl and each R' is selected from the group consisting of hydrogen and alkyl, the combined R' groups having up to 12 carbon atoms, and isoquinoline compounds, a quaternizing amount of organic halide quaternizing agent having more than one halogen atom on a single carbon atom, and a corrosion inhibiting amount of at least 0.05 mol per mol of quaternizing agent of a compound selected from the group consisting of citrates and stearates of metals selected from the group consisting of nickel, copper, iron and lead, thereby forming a corrosion inhibited quaternizable stock, curing said stock in a mold and removing quaternized product.

4. A method according to claim 3 wherein said corrosion inhibiting compound is nickel citrate.

5. A method according to claim 3 wherein said corrosion inhibiting compound is nickel stearate.

6. A quaternized heterocyclic nitrogen-base polymeric product prepared by the process according to claim 3.

7. A method of forming a quaternized heterocyclic nitrogen-base polymer which comprises blending with a copolymer of butadiene and 2-methyl-5-vinylpyridine from 0.2 to 1.1 mols of a quaternizing agent selected from the group consisting of hexachloro-p-xylene, benzotrichloride, and benzal chloride per mol of reactive nitrogen in said polymer and from 0.05 to 3 mols per mol of quaternizing agent of a compound selected from the group consisting of citrates and stearates of metals selected from the group consisting of nickel, copper, iron and lead, thereby forming a corrosion inhibited quaternizable stock, curing said stock in a mold and removing quaternized product.

8. A quaternized heterocyclic nitrogen-base polymeric product prepared by the process according to claim 7.

9. A compounded stock having a quaternizable heterocyclic nitrogen-base which comprises a polymer of a monomer system comprising a heterocyclic nitrogen-base monomer selected from the group consisting of (a) 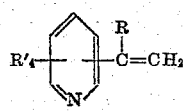

(b) 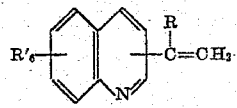

and (c) 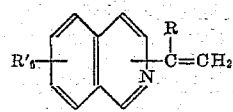

where R is selected from the group consisting of hydrogen and methyl and each R' is selected from the group consisting of hydrogen and alkyl, the combined R' groups having up to 12 carbon atoms, a quaternizing amount of organic halide quaternizing agent having more than one halogen atom on a single carbon atom, and a corrosion inhibiting amount of at least 0.05 mol per mol of quaternizing agent of a compound selected from the group consisting of citrates and stearates of metals selected from the group consisting of nickel, copper, iron and lead.

References Cited in the file of this patent
UNITED STATES PATENTS

| | | |
|---|---|---|
| 2,671,758 | Vinograd et al. | Mar. 9, 1954 |
| 2,746,943 | Pritchard | May 22, 1956 |
| 2,767,159 | Potts et al. | Oct. 16, 1956 |
| 2,776,917 | Shnitzler et al. | Jan. 8, 1957 |
| 2,801,224 | Greer | July 30, 1957 |
| 2,808,349 | Melamed | Oct. 1, 1957 |
| 2,861,863 | Schuster et al. | Nov. 25, 1958 |
| 2,861,902 | Pritchard | Nov. 25, 1958 |